United States Patent

Maldonado et al.

[15] 3,663,088
[45] May 16, 1972

[54] STRAIN-BIASED FINE GRAIN ELECTROOPTIC CERAMIC DEVICE FOR CONTROLLING OPTICAL PHASE RETARDATION

[72] Inventors: Juan Ramon Maldonado, Berkeley Heights; Allen Henry Meitzler, Morristown, both of N.J.

[73] Assignee: Bell Telephone Laboratories, Incorporated, Murray Hill, N.J.

[22] Filed: Aug. 10, 1970

[21] Appl. No.: 62,358

[52] U.S. Cl. ............................ 350/150, 350/149, 350/160, 350/DIG. 2
[51] Int. Cl. ........................................................ G02f 1/20
[58] Field of Search ............................ 350/149–150, 157, 350/160–161, DIG. 2

[56] References Cited

UNITED STATES PATENTS

| | | | |
|---|---|---|---|
| 3,531,182 | 9/1970 | Lund et al. | 350/150 |
| 3,499,704 | 3/1970 | Lund et al. | 350/150 |
| 3,228,290 | 1/1966 | Davisson et al. | 350/150 |
| 3,245,315 | 4/1966 | Marks et al. | 350/150 |
| 3,499,700 | 3/1970 | Harris et al. | 350/150 |
| 3,512,864 | 5/1970 | Haertling et al. | 350/150 |
| 3,516,013 | 6/1970 | Pole | 350/150 X |

*Primary Examiner*—David Schonberg
*Assistant Examiner*—Paul R. Miller
*Attorney*—R. J. Guenther and Arthur J. Torsiglieri

[57] ABSTRACT

A controllable optical phase retardation device includes a fine grain electrooptic ceramic plate, such as lanthanum doped lead zirconate-lead titanate. The plate is subjected to a constant and uniform strain with a tension axis in the plane of the plate, while a beam of optical radiation traverses the thickness of the plate. By applying voltages to a pair of transparent electrode layers located on opposed major surfaces of the plate, the degree of birefringence is controlled, that is, the relative optical phase retardation of the extraordinary and ordinary rays in the optical beam propagating through the plate is controllably varied by the electric fields perpendicular to the surfaces of the plate. This control over the phase retardation can be converted into optical intensity modulation or optical beam deflection by means of a conventional polarizer together with an optical analyzer or a doubly refracting prism.

10 Claims, 3 Drawing Figures

PATENTED MAY 16 1972          3,663,088

STRAIN-BIASED FINE GRAIN ELECTROOPTIC CERAMIC DEVICE FOR CONTROLLING OPTICAL PHASE RETARDATION

BACKGROUND OF THE INVENTION

In the prior art, electrooptic materials, including ferroelectrics, have been used as the active element in controllable optical phase retardation devices (modulators). By means of electric fields applied perpendicular (transverse) to the direction of propagation of an optical beam through such materials, the relative phase retardation between the ordinary and extraordinary rays in the beam can be controlled. However, because of the transverse direction of the electric fields ordinarily used in such devices, the voltages required are proportional to the diameter of the aperture, and therefore undesirably large voltages are required for large apertured devices. Thus, the use of electric fields in the direction parallel (longitudinal) to the direction of propagation of the optical beam suggests a means to avoid such large voltage requirements. However, undesirably large voltages are ordinarily required even in those devices utilizing longitudinal electric fields, in order to obtain a useful optical phase retardation.

FIELD OF THE INVENTION

This invention relates to the field of optical phase retardation devices, in particular to those involving electrooptic materials as the optical retarding element.

SUMMARY OF THE INVENTION

This invention provides an optical phase retardation modulator in which the required applied voltage is relatively small (less than 250 volts in a described embodiment) and is also independent of the size of temperature of the active element. In accordance with this invention, the electrooptic element is a strain-biased, electrooptic fine grain, ceramic parallel plate, such as fine grain, lanthanum doped, lead zirconate-lead titanate manufacture by a hot pressing process. By "fine grain" is meant such a polycrystalline lead zirconate-lead titanate ceramic composed of grains about 2 microns in diameter or less. More generally, a fine grain ceramic is one in which the grain size is sufficiently small such that the ceramic does not depolarize forward scattered light propagating therethrough. On the other hand, the strain biasing is provided advantageously by a spatially uniform tensile or compressive stress applied in the plane of the ceramic plate, the applied stress being constant in time. Thereby, domains are caused to align with their polarization directions along the tension axis of the applied stress, although the average electric polarization remains zero. As a result, a condition of birefringence is likewise induced in the plate with respect to the transmitted components of optical radiation incident normally on the plate. This condition has been described in our copending U.S. Pat. application Ser. No. 672, filed on Jan. 5, 1970. Electric fields applied in a direction perpendicular to the plane of the strain-biased ceramic plate have been found to control the degree of birefringence of the plate with respect to an optical beam propagating in the direction perpendicular to the plane of the plate (i.e., parallel to the electric fields). Thus, longitudinal electric fields can be used to control the amount of relative phase retardation undergone by ordinary and extraordinary rays of light in the beam as it traverses the thickness of the ceramic plate. Moreover, the voltages required to vary this retardation by a half wavelength of the optical beam can be less than 250 volts in the case of strain-biased fine grain electrooptic ceramics, such as lanthanum doped lead zirconate-lead titanate; whereas in the absence of the strain biasing, such ceramics would require much higher applied voltage to obtain a useful degree of control over the optical phase retardation.

It is known in the art that the composition of certain fine grain electrooptic ceramics, such as lanthanum doped lead zirconate-lead titanate, can be selected such that the ceramic, in response to applied voltages, exhibits either ferroelectric type of switching (i. e., with memory or "latching") or linear electrooptic type of switching. Thus, strain-biased electrooptic plates made of such fine grain ceramics can be used as the optical retarding element of a phase modulator, either of the memory ("latching") or the linear type, depending upon the composition of the ceramic.

In a specific embodiment of this invention, a fine grain ferroelectric ceramic plate is used in a strain-biased condition as the retarding element in a light gate. Advantageously, the plate is composed of lead zirconate-lead titanate, in the ratio of 65 to 35 percent (by weight), doped with about 2 to 8 percent (atomic percent) lanthanum. Such a composition exhibits ferroelectric ("latching") type of switching in response to applied voltage pulses. The plate is cemented to a surface of a transparent (or at least partially transparent) elastic member which is then stretched, thereby producing a state of strain in the plate. While the plate is in this strain-biased condition, voltage pulses of opposite polarity are applied sequentially to a pair of transparent (or at least partially transparent) electrode layers located on a pair of opposed major surfaces of the ceramic plate. These voltage pulses produce first and second states of birefringence in the plate, depending upon the polarity of the immediately preceding pulse. These states have the property that the birefringence of the plate in the first state is different from that in the second state. Therefore, the resulting relative phase retardation in the components of optical radiation propagating through the plate between the pair of opposed major surfaces is different in the first state from the relative retardation in the second state. Such a difference in relative phase radiation, as known in the art, can be converted into either optical intensity modulation or optical beam deflection by means of a polarizer located in front of the plate and, respectively, an analyzer or a doubly refracting prism located behind the plate.

In another specific embodiment of this invention, a two-dimensional multielement array of light gates, suitable for page composers in optical memory systems, can be fabricated in a single, fine-grain ferroelectric ceramic plate, by forming each of the abovementioned electrode layers as an array of parallel transparent (or at least partially transparent) electrode grid lines, each array located on an opposed major surface of the plate, the arrays being mutually oblique. Voltages of opposite polarity are applied to a pair of selected electrode lines, one line in each array, thereby subjecting the crossover position of these lines to an electric field above switching threshold, but not elsewhere, in the plate. Thus, the birefringence of the plate at each such crossover position is separately controllable, thereby providing a two-dimensional multiaddressable optical modulator.

BRIEF DESCRIPTION OF THE DRAWING

This invention, together with its features, advantages, and objects can be better understood from the reading of the following detailed description when read in conjunction with the drawings in which.

DETAILED DESCRIPTION

Figure 1:
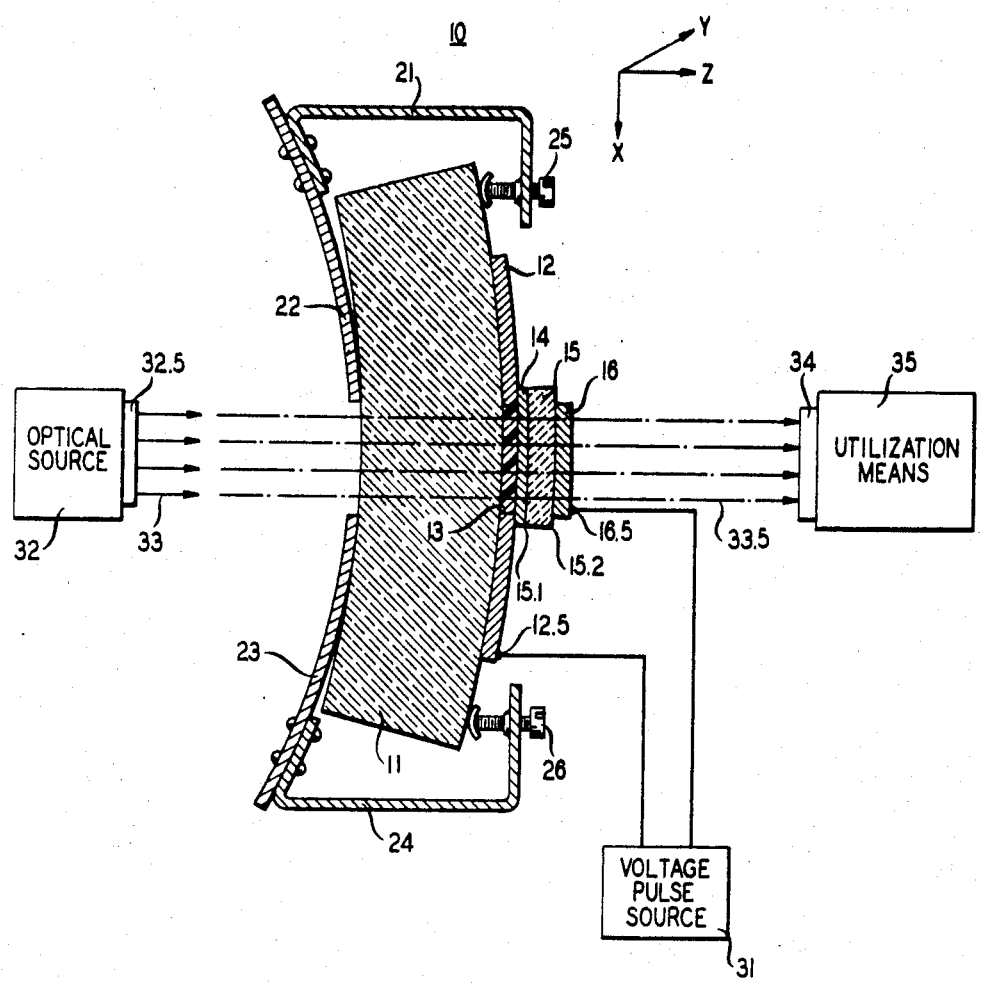
FIG. 1 is a diagrammatic illustration, partly in cross section, of an optical phase retardation system, according to a specific embodiment of the invention.

As shown in FIG. 1, an optical phase modulation device 10, to be described in greater detail below, is controlled by a voltage pulse source 31, in order to modulate the optical phase in an optical beam 33 traversing this device 10. The beam 33 is supplied by an optical source 32 after passage through a polarizer 32.5. After traversing the device 10, the resulting exit beam 33.5 is collected for utilization by means 35, typically after traversing a doubly refracting means 34.

The device 10 includes a transparent elastic member 11 subjected to a bending moment, a centrally apertured opaque metal layer 12, a fine grain ferroelectric plate 15, transparent electrically conducting electrode layers 14 and 16, and a layer 13 of transparent bonding material, typically epoxy cement, firmly attaching the electrode layer 14 to the elastic member 11.

The transparent elastic member 11, typically of Plexiglas, serves as a substrate for the vapor deposition of the opaque metal contact layer 12. Typically, the elastic member 11 is about 2 inches long in the y direction, about one inch wide in the x direction, and about one-eighth of an inch thick in the z direction. The metal contact layer 12 typically is a layer of gold about 5000 A. thick, deposited upon a layer of chromium about 100 A. thick for adhesion to the Plexiglas member 11 of this metal layer 12. At the center of the metal layer 12 is a rectangularly shaped aperture filled with the transparent epoxy cement layer 13. At an edge of the metal layer 12 is located a terminal 12.5 for external electrical connection.

The ferroelectric parallel plate 15 is advantageously a fine grain, hot pressed, ferroelectric ceramic composed of about 65 percent lead zirconate-35 percent lead titanate (by weight) doped with about 8 percent (atomic) lanthanum added as lanthanum oxide, as manufactured by Clevite Corp. for example. By reason of its composition, the plate 15 exhibits ferroelectric (memory) type of switching. Upon a first major surface 15.1 of this ferroelectric plate 15 is sputtered the electrode layer 14 of at least partially transparent, electrically conducting indium oxide, which is cemented by the epoxy layer 13 with respect to the Plexiglas member 11, thereby holding the plate 15 firmly in place.

Typically, the plate 15 is about 200 mils square in the xy plane and about 75 microns thick in the z direction. It is important that the electrode layer 14 overlap the epoxy layer 13 in order that this layer 14 make good electrical contact with the metal layer 12. A second major surface 15.2 of the ferroelectric plate 15, parallel to the first major surface 15.1, is coated with the transparent electrically conducting electrode layer 16. This layer 16 typically is indium oxide. Typically, the layer 16 is vapor deposited upon the surface 15.2. The electrode layer 16 is provided with a terminal 16.5 for external electrical connection.

The ferroelectric ceramic plate 15 is subjected to tensile stress, thereby inducing the strain-biased condition therein, by means of the metal holders 21-24 in conjunction with the setscrews 25 and 26 applied to the transparent elastic member 11. These setscrews produce a bending moment in the transparent elastic member 11. Bending of the member 11 in turn produces a spatial uniform tensile stress (along the X-axis) in the ferroelectric plate 15, typically of the order of $10^{-3}$. Thereby, the plate is put in a state of birefringence with respect to optical radiation in the beam 33. It should be understood that the ferroelectric plate 15 is maintained in this same strain-biased condition in all operations therewith. However, the state (degree) of birefringence of this plate 15 in this strain-biased condition can be modified by applied electric fields as will be presently described, thereby modifying the optical phase retardation in the exit beam 33.5. Thus, the stressed elastic member 11, together with the attached plate 15 and the electrode layers 14 and 16 form the optical phase modulation device 10.

As mentioned above, the optical source 32 provides an input beam 33 of optical radiation incident upon the member 11. The beam 33 is advantageously polarized by the polarizer 32.5 at an angle of 45° with respect to the x axis in the xy plane. A voltage pulse source 31 provides a first pulse of voltage typically of height about 220 volts for a period typically of the order of a microsecond. Subsequent to this voltage pulse, the plate 15 is in a first state of birefringence in that the components of input beam 33, polarized in the x and y directions, suffer a first relative phase retardation while traversing the plate 15; that is, the ordinary ray of the beam 33 undergoes a first relative phase retardation relative to the extraordinary ray. This phase retardation is different from that associated with the strain-biased condition existing previous to the first applied voltage pulse. Thereafter, a second voltage pulse from the source 31 is applied to the terminals 12.5 and 16.5 of the electrodes 12 and 16, this second pulse being of opposite polarity from the first pulse and having a pulse height about one-third that of the first pulse, that is, typically about 80 volts. As a result of this second voltage pulse, the ferroelectric plate 15 is subsequently in a second state of birefringence, which produces a second relative phase retardation of the components in the beam 33 which is different from the first phase retardation. Advantageously, the color of the light furnished by the optical source 32 is monochromatic of a wavelength typically about 6,000 A., such that the ordinary and extraordinary layers in the beam 33 suffer a relative phase retardation of 180° in the second state of birefringence of the plate 15. Thus, the state of polarization of the output beam 33.5, after traversing the plate 15 in its second birefringence state, will correspond to a direction of optical polarization oriented at an angle of 90° with respect to the direction of polarization of the input beam 33. This is due to the well-known fact that a 180° phase shift between ordinary and extraordinary rays of equal amplitudes in an optical beam produces a 90° spatial rotation of the direction of polarization therein. Moreover, when the beam 33 traverses the plate 15 in the first state of birefringence, the outbeam 33.5 will be in a different state of polarization from that corresponding to the 90° spatial rotation. The exit beam 33.5 in these two possible states of polarization is collected by means 35 for utilizing the exit beam 33.5 in these different states of polarization, after traversing the doubly refracting means 34 to be described below.

For use of the system shown in FIG. 1 as an optical intensity modulator, the doubly refracting means 34, advantageously takes the form of an optical analyzer the axis of which is crossed (i.e., perpendicular) with respect to the axis of the polarizer 32.5.

For use of the system shown in FIG. 1 as an optical light deflector, the doubly refracting means 34 advantageously can be a Rochon or Wollaston prism which transmits and directs into two different directions ("digitally") those components of light which are polarized at 45° with respect to the positive x axis (first quadrant in the xy plane) and those components of light which are polarized at an angle of 135° with respect to the positive x axis (second quadrant in the xy plane). Thus, the light in the exit beam 33.5 corresponding to the first and second states of birefringence of the plate 15 will be controllably deflected into two different directions, depending upon the state of birefringence of the plate 15, which in turn is controlled by the immediately preceding voltage pulse applied by the source 31.

Figure 2:
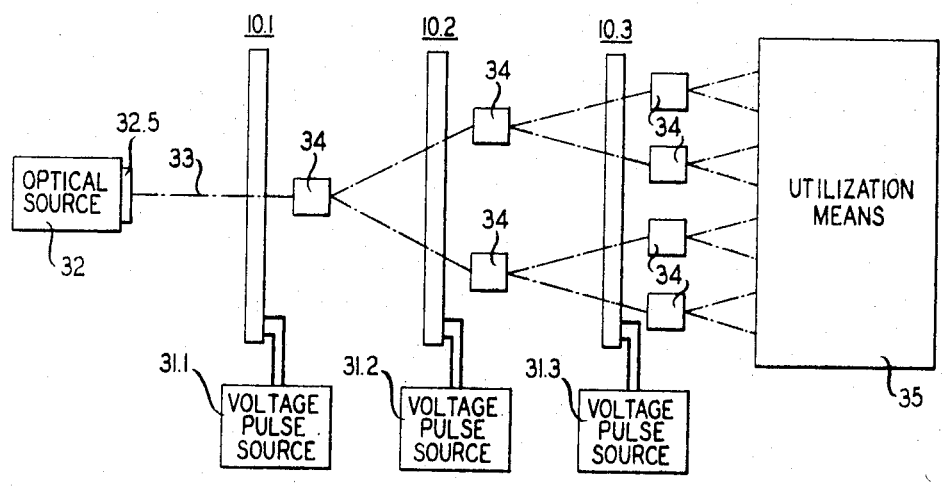
FIG. 2 is a diagrammatic illustration of a multistage optical deflection (scanning) system, according to another specific embodiment of the invention.

An optical scanning system, as illustrated in FIG. 2, can be realized in accordance with another feature of the invention by means of locating in sequence a plurality of digital light deflection stages. For purposes of illustration, there are but three such stages shown in FIG. 2. Each stage contains a single optical phase modulator device 10.1, 10.2, or 10.3, each of which is similar to the optical phase modulator devices 10 previously described in conjunction with FIG. 1. Moreover, each stage of the scanning system shown in FIG. 2 includes its own independent voltage pulse source 31.1, 31.2, or 31.3; and each stage of the system also has its own set of deflecting prisms 34. In general, the N'th stage contains $2^{N-1}$ such prisms 34. The dotted lines in FIG. 2 indicate the possible digital beam paths through the system. In each stage of digital deflection (since each of the devices 10.1-10.3 contains only a single ferroelectric plate similar to the plate 15 described above in connection with FIG. 1, and since only longitudinal electric fields are applied to each such plate 15), the required applied voltage pulse heights supplied by the sources 31.1-31.3 are dependent only upon the thickness of the plates 15 and not upon the dimensions of the cross section of the apertures thereof.

Figure 3:
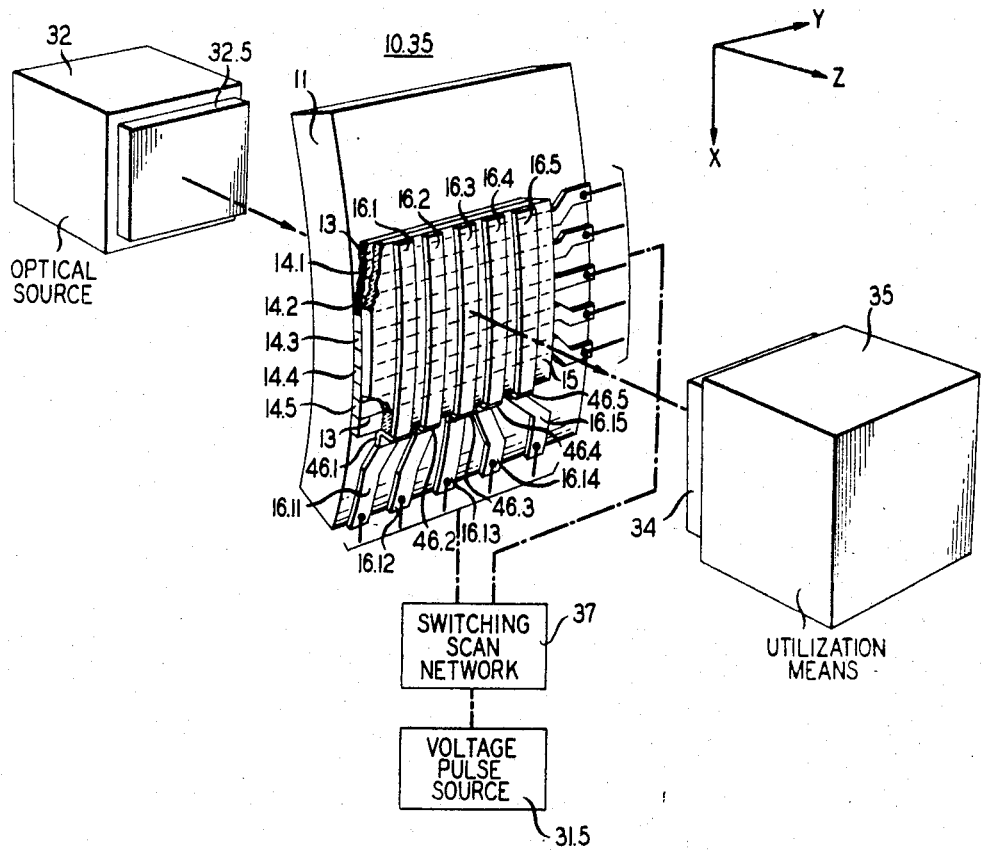
FIG. 3 is a diagrammatic illustration, in cross section, of a multiaddressable optical modulation system, according to another specific embodiment of the invention.

FIG. 3 illustrates still another embodiment of the invention, namely a page composer for optical memory systems. This embodiment includes a phase modulation device 10.35 which is similar to the device 10 previously described, except that the electrode layer 14 is now a thin film grid array 14.1–14.5 of transparent electrodes running along the $y$ direction on a major surface of the plate 15; and the electrode layer 16 is now a thin film grid array 16.1–16.5 of transparent electrodes running along the $x$ direction (typically perpendicular to the $y$ direction), on an opposed major surface of the plate 15. Thereby, a multiaddressable two-dimensional array of locations in the $xy$ plane is defined in the plate 15 by the crossover positions of the grid arrays 14.1–14.5 and 16.1–16.5. Each of the electrodes in each of these grid arrays is separately connected electrically to a switching scan network 37 which advantageously energizes simultaneously one electrode selected from each of these grid arrays. Thereby, but a single crossover position is selected at a time, by means of applying from the source 31.5 through the network 37 a pulse of one polarity to a selected one of the electrodes 14.1–14.5 and simultaneously a pulse of equal magnitude but opposite polarity to a selected one of the electrodes 16.1–16.5. For example, in the case of the plate 15 described above, $\pm 110$ volt pulses are applied to the selected pair of electrodes to induce the first state of birefringence in the plate 15 at the selected $xy$ crossover position, whereas $\pm 40$ volt pulses are applied to induce the second state of birefringence thereat.

As previously described above in connection with FIG. 1, the plate 15 in FIG. 3 is likewise subjected to a constant and uniform strain, by reason of its having been cemented firmly in place by the epoxy 13 to the elastic member 11 which is then subjected to a bending moment. Typically, each of the electrodes 14.1–14.5 and 16.1–16.5 is indium oxide, 250 microns wide, with a mutual spacing of 50 microns. Conventional vapor deposition, masking and etching, can be used to form these electrodes on opposed major surfaces of the plate 15. Moreover, each of these electrodes 16.1–16.5 is advantageously connected to the switching network 37 by means of somewhat conveniently wider and thicker "sunburst" shaped electrodes 16.11–16.15, typically gold deposited on the elastic member 11. Electrical connection between these electrodes 16.11–16.15 to 16.1–16.5 is afforded conveniently by silver paste contacts 46.1–46.5.

For a one dimensional, instead of two dimensional, multiaddressable array of locations in the plane of the plate 15, only one of the transparent electrode layers 14 or 16 in the device 10 (shown in FIG. 1) need be modified into the grid array 14.1–14.5 or 16.1–16.5 (shown in FIG. 3).

In order to produce continuous, rather than abrupt, modulation of the optical phase retardation (or beam deflection) in the system shown in FIGS. 1 through 3, the voltage sources 31, 31.1–31.3 or 31.5 are selected to be continuous rather than pulse voltage sources, while the composition of the strain-biased plates 15 is selected to be a fine grain ceramic which exhibits a linear electrooptic effect even in the presence of strain. For example, fine grain ceramics of lead zirconate-lead titanate compositions, containing less than 50 percent by weight lead zirconate and doped with over 5 percent lanthanum may be suitable as linear electro-optic modulator materials for the strain-biased plate 15. In conjunction with a voltage source 31 of arbitrary waveform, the degree of modulation in the output optical beam 33.5 can likewise be made of any arbitrary waveform.

Although this invention has been described in detail with reference to specific embodiments, it should be obvious to the skilled worker in the art that various modifications may be made without departing from the scope of this invention.

What is claimed is:

1. An optical phase modulator which comprises:

a. a fine grain electrooptic ceramic plate in a strained condition, said condition characterized by a strain produced by a spatially uniform stress applied in the plane of the plate, such that the plate is in a birefringent state with respect to an optical beam propagating between a pair of opposed major surfaces of the plate characterized in that the degree of birefringence of the plate can be varied by means of electric fields applied in a direction perpendicular to said surfaces; and b. a pair of transparent electrically conductive electrodes, each of which is located on a different one of the major surfaces in order to produce said electric fields to vary the degree of birefringence of the plate when voltages are applied to the electrodes.

2. An optical modulator in accordance with claim 1 which further includes an elastic transparent member to which the plate is cemented and to which a bending moment is applied, whereby the plate is put in the strained condition.

3. The optical modulator recited in claim 1 in which the plate is also ferroelectric.

4. The optical modulator recited in claim 3 which further includes means for applying a sequence of differing voltage pulses to the electrodes in order to produce differing degrees of birefringence in the plate.

5. The optical modulator recited in claim 3 in which the plate is essentially lead zirconate-lead titanate doped with an impurity.

6. The optical modulator recited in claim 5 in which the impurity is lanthanum.

7. The optical modulator recited in claim 3 which further includes an optical analyzer located in the path of the optical beam on the opposite side of the plate from a source of the optical beam.

8. An optical beam deflector which comprises:

a. the modulator recited in claim 3; and b. an optical deflection device responsive to the state of polarization of the optical beam exiting from the plate, the device being located in the path of the exiting beam.

9. A multiaddressable optical phase modulator which comprises:

a. a fine grain ceramic electrooptic plate in a strained condition, said condition characterized by a strain produced by a spatially uniform stress applied in the plane of the plate;

b. an array of parallel at least partially transparent electrodes on a major surface of the plate; and c. an at least partially transparent electrode layer on an opposed major surface of the plate, whereby the degree of birefringence of the plate in each of the regions underneath each of the electrodes in the array can be separately controlled by means of voltages applied to each of the electrodes.

10. A two-dimensional multiaddressable optical phase modulator which comprises:

a. a fine grain electrooptic ceramic plate in a strained condition, said condition characterized by a strain produced by a spatially uniform stress applied in the plane of the plate;

b. a first array of mutually parallel at least partially transparent electrodes on a first major surface of the plate; and c. a second array of mutually parallel at least partially transparent electrodes on a second opposed major surface of the plate, the first and second arrays being oblique with respect to each other, thereby providing a two-dimensional array of addressable locations defined by the crossover positions of the first and second arrays, the degree of birefringence of the plate at each of said locations being separately controllable by means of voltages of opposite polarity applied to that pair of electrodes in the first and second arrays corresponding to said location.

* * * * *